R. E. HELLMUND.
SYSTEM OF CONTROL.
APPLICATION FILED MAR. 14, 1917.

1,355,475.

Patented Oct. 12, 1920.

WITNESSES:
Fred A. Lind.
W. R. Coley

INVENTOR
Rudolf E. Hellmund
BY
Charles G. Carr
ATTORNEY

UNITED STATES PATENT OFFICE.

RUDOLF E. HELLMUND, OF SWISSVALE, PENNSYLVANIA, ASSIGNOR TO WESTINGHOUSE ELECTRIC AND MANUFACTURING COMPANY, A CORPORATION OF PENNSYLVANIA.

SYSTEM OF CONTROL.

1,355,475. Specification of Letters Patent. Patented Oct. 12, 1920.

Application filed March 14, 1917. Serial No. 154,865.

*To all whom it may concern:*

Be it known that I, RUDOLF E. HELLMUND, a subject of the Emperor of Germany, and a resident of Swissvale, in the county of Allegheny and State of Pennsylvania, have invented a new and useful Improvement in Systems of Control, of which the following is a specification.

My invention relates to systems of control and especially to the control of electric-railway motors and the like during regenerative periods.

The object of my invention is to provide a system of the above-indicated character embodying exciter means for normally obtaining relatively "flat" speed-torque characteristic curves that is, an approximately constant speed may be obtained over a relatively wide range of torque requirements, the exciting means being inherently operative to produce relatively "steep" speed, torque curves under heavy regenerative current conditions, that is, an approximately constant torque obtains over a certain range of speed variation, whereby the machine torque is prevented from exceeding a predetermined value, for example, the value corresponding to the "slipping-point" of the vehicle wheels.

Figure 1:
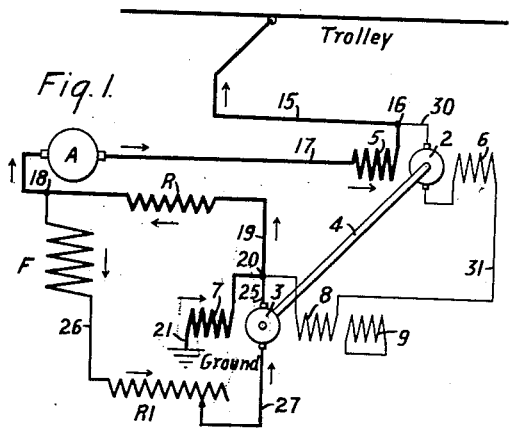
Figure 2:
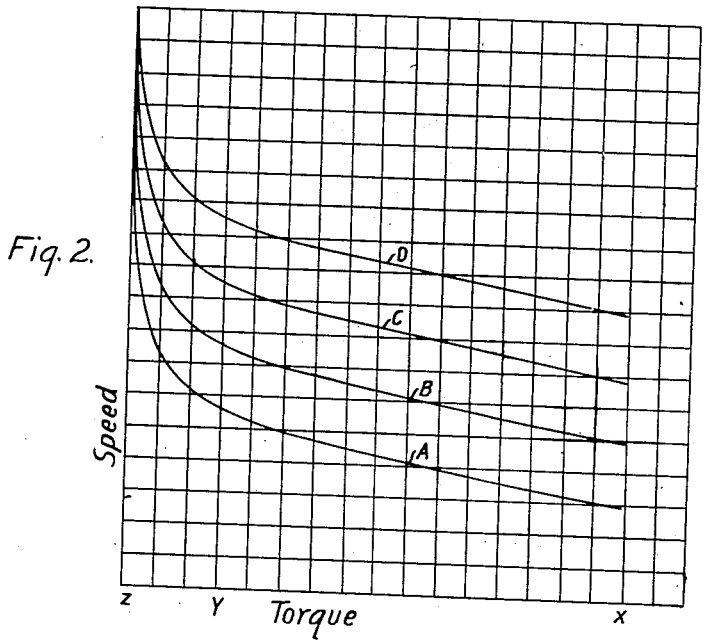

My invention may best be understood by reference to the accompanying drawing, wherein Figure 1 is a diagrammatic view of a set of main-machine and auxiliary-machine circuits embodying my present invention; and Fig. 2 is a curve chart graphically illustrating the preferred speed-torque characteristic curves of the main motor that is included in the system shown in Fig. 1.

Referring first to the curve chart (Fig. 2), wherein the ordinates represent speed values in miles per hour or other suitable units and the abscissæ represent increments of torque in foot-pounds or other appropriate units, a plurality of speed-torque curves A, B, C and D, corresponding to different values of speed at a predetermined reference ordinate, such as $x$, are shown. It will be observed that the various curves are relatively "flat" over a distance between ordinates $y$ and $x$, for example, that is to say, the regenerative speed corresponding to the end of the regenerative period, as indicated upon the ordinate $x$, does not vary materially during the greater portion of regenerative operation, when the main momentum-driven machine is operating in accordance with any one of the illustrative curves between the limits represented by the ordinates $y$ and $x$.

On the other hand, at the ordinate $y$, for example, the characteristic curves take a "steep" or sharp upward turn, that is, the torque produced by the momentum-driven machine is maintained approximately constant over a certain speed range, each of the curves approaching some particular ordinate, such as $z$, as an asymptote. Thus, the various curves, corresponding to different regenerative speeds, are materially farther apart for relatively light currents than for relatively heavy currents. The ordinate $z$ may correspond, for example, to the "slipping-point" of the wheels for the vehicle which is equipped with my regenerative control system.

It will thus be seen that, for any given final speed of the momentum-driven machine, as indicated upon the ordinate $x$, the normal regenerative speed remains approximately constant over a relatively wide range of operation, but, as the "slipping-point" of the wheels, or any other predetermined torque value, is approached, the characteristic curves of the regenerative machine become relatively "steep" and thus prevent such "slipping-point" or other torque value from being exceeded. By equipping a vehicle with a system like, or equivalent to, that shown in Fig. 1 and about to be described, the conditions graphically indicated in Fig. 2 may be very nearly obtained without unnecessarily increasing the complication or cost of the system, and thus, any desired braking effort may be obtained for a number of different final speeds, and the slipping of wheels or other undesirable torque conditions are inherently obviated.

Referring to Fig. 1, the system shown comprises suitable supply-circuit conductors "Trolley" and "Ground"; a main dynamo-electric machine having an armature A and a field winding F of the series type; a main-circuit stabilizing resistor R; an adjustable field-circuit resistor R1; and an auxiliary dynamo-electric exciter or motor-generator having a plurality of auxiliary armatures 2 and 3 that may be mechanically connected in any suitable manner, as by a shaft 4.

The auxiliary armature 2 is employed as a motor that is driven from the supply circuit and is provided with a field winding 5 that carries the full main-armature or regenerated current and a second cumulatively-related field winding 6 that is energized by the current traversing the auxiliary armature 2.

The other auxiliary armature 3 is employed in a generating or exciting capacity in connection with the main field winding F and is similarly provided with a field winding 7 that is traversed by the main-armature or regenerated current and a cumulatively-related field winding that is connected in series relation with the auxiliary motor armature 2 and its field winding 6. If desired, in order to vary the operating characteristics of the generator armature 3 to better meet certain service conditions, a short-circuited compensating field winding 9 for the exciting armature 3 may be provided and may exert either a cumulative or a differential action upon the allied field windings 7 and 8.

Assuming that regenerative operation has been begun in any suitable manner, which need not be described here, and that the various circuit connections are as illustrated in Fig. 1, such circuits may be traced as follows: the main-armature or regenerative circuit is established from the trolley through conductor 15, junction-point 16, field winding 5 for the auxiliary motor armature 2, conductor 17, main armature A, junction-point 18, stabilizing resistor R, conductor 19, junction-point 20, field winding 7 for the auxiliary exciting armature 3 and conductor 21 to the negative supply-circuit conductor "Ground."

The main field-winding circuit is established from the positive terminal of the generator armature 3 through conductor 25, junction-point 20, conductor 19, stabilizing resistor R, junction-point 18, main field winding F, conductor 26, adjustable resistor R¹ and conductor 27 to the negative terminal of the exciting armature 3.

An auxiliary circuit is completed from junction-point 16 through conductor 30, auxiliary motor armature 2, series-related field winding 6, conductor 31, field winding 8 for the auxiliary generator armature, junction-point 20 and thence to ground as already traced.

As indicated by the various arrows, the regenerated current traverses the stabilizing resistor R in the same direction as the main field-winding current that is delivered by the auxiliary exciting armature 3. By reason of this arrangement of parts, an inherently stable regenerative system is provided, since an incipient increase of regenerated current immediately produces a correspondingly greater voltage drop in the resistor R and an accordingly decreased voltage is delivered to the main field winding F from the generator armature 3. Such reduction of main field-winding excitation causes the regenerated or main-armature current to subside to a normal value. The converse action takes place in case of an incipient decrease of regenerated current. The circuit connections just recited are fully set forth and claimed in my co-pending application 44,443, filed August 9, 1915, which has matured into Patent No. 1,298,706, granted April 1, 1919, to which reference may be made for a more detailed explanation.

By reason of the arrangement of auxiliary field windings, each of the auxiliary armatures 2 and 3 is excited by fluxes corresponding to the sum of the regenerated and auxiliary motor-armature currents. Since the auxiliary motor current is proportional to the current in the field winding F by reason of the fact that the main field winding is energized only by current from the driven or excited armature 3, it follows that the field excitation of each auxiliary machine is substantially proportional to the sum of the main-field-winding current and the main-armature or regenerated current. By a suitable design and arrangement of parts, the sum of the two currents just mentioned can be made to correspond, over a fairly wide range, to their products and, consequently, to the main-machine torque, in accordance with familiar principles.

Assume, for example, that the adjustment is made for a constant sum of armature and field current of 20.6 amperes, while the field current is assumed to vary between 6.9 and 13.8 amperes, that is, over a range of 1 to 2.

The armature currents are then $$\left.\begin{array}{l}20.6 - 6.9 = 13.7\\ 20.6 - 8\ \ = 12.6\\ 20.6 - 9\ \ = 11.6\\ 20.6 - 10 = 10.6\\ 20.6 - 11 = 9.6\\ 20.6 - 12 = 8.6\\ 20.6 - 13 = 7.6\\ 20.6 - 13.8 = 6.8\end{array}\right\} \text{and the products of field and armature currents, being proportional to torque, are} \left\{\begin{array}{l}94\\ 101\\ 104\\ 106\\ 106\\ 103\\ 99\\ 94\end{array}\right.$$

showing that the product varies only 6% from the desired average value of 100, if the sum is held constant.

During normal operation, that is, when the main momentum-driven machine is operating in accordance with any one of the curves of Fig. 2 between the ordinates $y$ and $x$, the effects of the regenerated-current-excited field windings 5 and 7 will correspond, or be substantially proportional, to the effect of the series-related field windings 6 and 8, respectively. Thus, any normal change in regenerative current does not materially affect the voltage delivered by the auxiliary generator armature 3.

Under relatively heavy regenerative current conditions, however, the correspondingly increased flux traversing the magnetic circuits of the auxiliary generator armature 3 causes a relatively high degree of saturation thereof by reason of a selected proportion of parts, whereby any further material increase of main field-winding excitation is inherently prevented. On the other hand, the magnetic circuits of the auxiliary motor armature 2 are designed to be relatively unsaturated under such heavy-current conditions and, therefore, any further increase of regenerated current will correspondingly augment the excitation of the auxiliary motor 2 and thereby decrease its speed. The speed and voltage of the auxiliary exciting armature 3 are correspondingly reduced by such action. Consequently, by suitable design of auxiliary machine parts, the speed-torque curves at the points corresponding to the ordinate $y$ or any other desired point may be made as "steep" as desired and the main-machine torque is thus inherently prevented from exceeding the "slipping-point" of the wheels.

As will be understood, by properly proportioning the ampere-turns of the various windings, the torque range $y-x$ for the individual curves A, B, C and D may be varied to suit the requirements and, in particular, to avoid excessively high ratios of armature ampere-turns to field-winding ampere-turns, with consequent liability to "flash-over" difficulties.

I do not wish to be restricted to the specific circuit connections or arrangement of parts herein set forth, as various modifications thereof may be effected within the spirit and scope of my invention. I desire, therefore, that only such limitations shall be imposed as are indicated in the appended claims.

I claim as my invention:

1. In a system of regenerative control, the combination with a supply circuit and a dynamo-electric machine having an armature and a field winding, of a plurality of auxiliary armatures one of which is connected to excite the main field winding, and a plurality of cumulatively-related field windings for each of the auxiliary armatures respectively energized in accordance with the regenerated current and the current traversing a certain one of said auxiliary armatures to effect excitation of the main machine to cause it to operate in accordance with some one of a number of speed-torque characteristic curves that are mutually materially farther apart for relatively light than for relatively heavy regenerated currents.

2. In a system of regenerative control, the combination with a supply circuit and a dynamo-electric machine having an armature and a field winding, of a plurality of auxiliary armatures respectively driven from the supply circuit and connected to excite the main field winding, and means for varying the excitation to produce an approximately constant main-machine speed over a relatively wide range of regenerative operation and to inherently prevent the main-machine torque from exceeding a predetermined value comprising field windings for said auxiliary armatures responsive to electrical quantities of the system which are proportional to the loads on the main machine and the auxiliary driving armature.

3. In a system of regenerative control, the combination with a supply circuit and a dynamo-electric machine having an armature and a field winding, of a plurality of auxiliary armatures respectively driven from the supply circuit and connected to excite the main field winding, and a plurality of cumulatively-related field windings for each of the auxiliary armatures respectively energized in accordance with the regenerated current and the auxiliary driving-armature current, said driving armature having an unsaturated field-magnetic circuit under relatively heavy current conditions and said exciting armature being provided with a highly saturated field-magnetic circuit under such conditions.

4. In a system of regenerative control, the combination with a dynamo-electric machine having an armature and a field winding, of a plurality of auxiliary armatures one of which is connected to excite the main field winding, and means for exciting both auxiliary armatures substantially in proportion to the sum of the main-machine armature and field-winding currents.

5. In a system of regenerative control, the combination with a dynamo-electric machine having an armature and a field winding, of a plurality of auxiliary armatures one of which is connected to excite the main field winding, the exciting armature being provided with a relatively highly saturated field-magnetic circuit during a portion of the regenerative operation, and means for exciting both auxiliary armatures responsively to the main-machine armature and field-winding currents.

6. In a system of regenerative control, the combination with a supply circuit and a dynamo-electric machine having an armature and a field winding, of an auxiliary armature connected to excite the main field winding, and means for varying the excitation to produce an approximately constant main-machine speed over a relatively wide range of regenerative operation and to inherently prevent the main-machine torque from exceeding a predetermined value comprising field windings for said auxiliary armature responsive to electrical quantities of the system which are dependent upon the load on the main machine and upon its field excitation.

In testimony whereof, I have hereunto subscribed my name this 1st day of March, 1917.

RUDOLF E. HELLMUND.